United States Patent [19]

Sarno

[11] 4,066,110
[45] Jan. 3, 1978

[54] APPARATUS FOR SPLITTING LOGS
[76] Inventor: Richard L. Sarno, 5204 Guerin Pass, New Berlin, Wis. 53151
[21] Appl. No.: 724,671
[22] Filed: Sept. 20, 1976
[51] Int. Cl.² ............................................. B27L 7/00
[52] U.S. Cl. .............................. 144/193 A; 144/3 K; 254/105
[58] Field of Search ............. 144/193 R, 193 A, 3 K; 254/105, 106, 107

[56] References Cited
U.S. PATENT DOCUMENTS

| | | | |
|---|---|---|---|
| 2,580,735 | 1/1952 | Dagenais | 144/193 A |
| 2,938,706 | 5/1960 | Langen | 254/106 |
| 3,031,167 | 4/1962 | Roussel | 254/105 |
| 3,659,823 | 5/1972 | Griffin | 254/105 |
| 3,938,567 | 2/1976 | Dircksen et al. | 144/193 A |

Primary Examiner—Harrison L. Hinson
Assistant Examiner—W. D. Bray
Attorney, Agent, or Firm—Wheeler, Morsell, House & Fuller

[57] ABSTRACT

A wedge is mounted on one end of an elongated beam, and a hydraulic ram having a reaction member at one end and an extensible impact member at its opposite end is mounted on the other end of the beam with the impact member facing the wedge. When the impact member is extended, it pushes the end of a log against the wedge to split the log. Longitudinally spaced alternate abutment members, rigid with the beam, enable the ram to be locked in position for multiple strokes to double or otherwise increase the overall effective stroke of the ram without increasing its length. Cooperating latching means on the beam and impact member latch the impact member to the beam in its extended position and permit the ram cylinder to be moved from one set of abutment members to another when fluid pressure in the ram is reversed.

7 Claims, 10 Drawing Figures

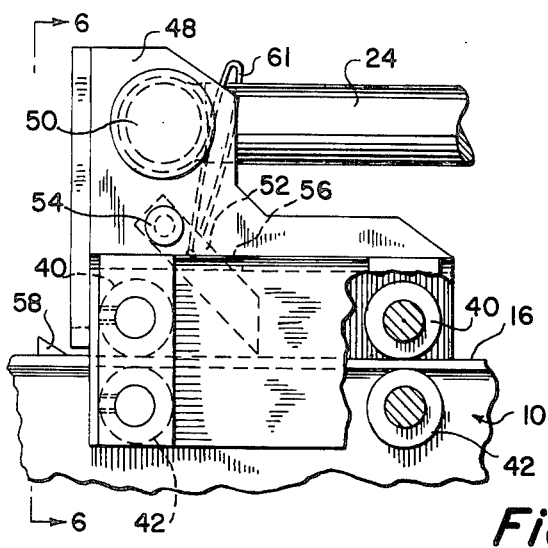
Fig. 3.
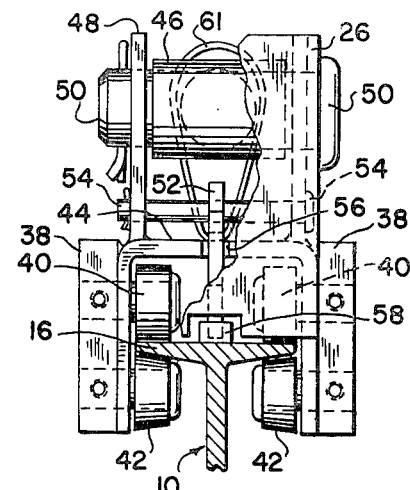
Fig. 6.
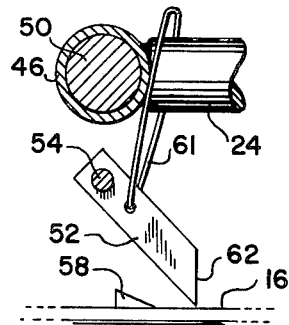
Fig. 4.
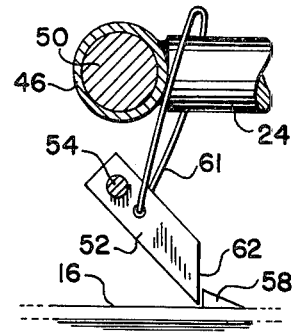
Fig. 5.
Fig. 7.
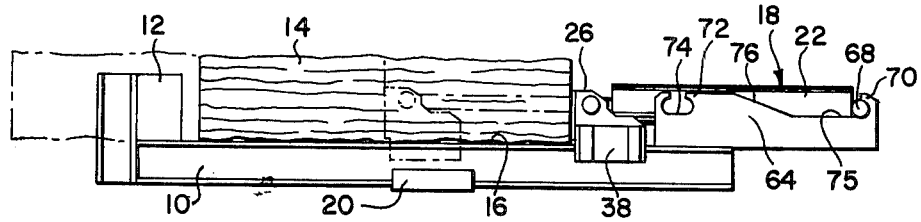
A.
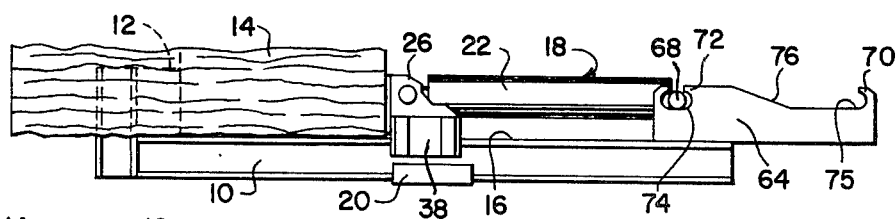
B.
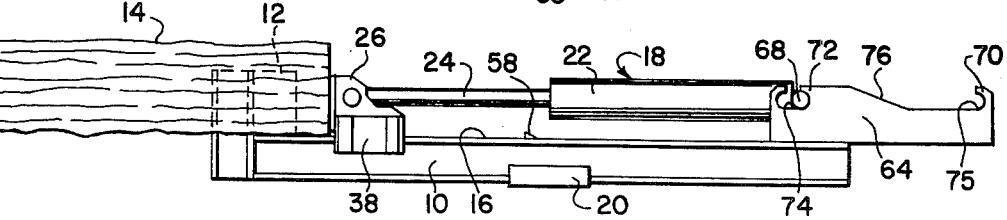
C.

APPARATUS FOR SPLITTING LOGS

BACKGROUND OF THE INVENTION

In the past, log splitters utilized a hydraulic cylinder having a relatively long stroke to drive one end of a log against a wedge to split the log. Particularly long strokes were required for elm logs, which are difficult to split, and, therefore, general purpose log splitters of the prior art have been relatively long, cumbersome, heavy, and expensive.

The principal object of this invention is to provide a general purpose log splitter which is significantly shorter, smaller, less expense, and lighter than those heretofore known in the art, but which has a long over-all effective stroke and is at least as effective in splitting logs as the more expensive and bulky prior art log splitters.

SUMMARY OF THE INVENTION

In accordance with this invention, the foregoing object is achieved by movably coupling the ram to the beam by the use of reaction means on the ram and cooperating longitudinally spaced alternate abutment means on the beam for coaction with the reaction means in either of two positions, one of which is closer to the wedge than the other, thereby multiplying the over-all effective stroke of the ram without increasing its length.

DESCRIPTION OF THE DRAWINGS

FIG. 3 is a fragmentary side view of the impact member and carriage.

FIG. 4 is a diagrammatic side view of the coacting latch means on the carriage and beam immediately before latching.

FIG. 5 is a diagrammatic side view of the latch means shown in FIG. 5 after latching.

FIG. 6 is a cross-sectional view taken on the line 6—6 of FIG. 3, with portions of the impact member cut away to reveal inner details.

FIG. 7 is a side view showing the ram and beam portions of the embodiment of FIGS. 1–6, in full lines in its initial position (view A), and in broken lines at the end of the first stroke; in view B in a position for the start of a second stroke; and in view C at the end of the second stroke.

DESCRIPTION OF THE PREFERRED EMBODIMENT

Figure 1:
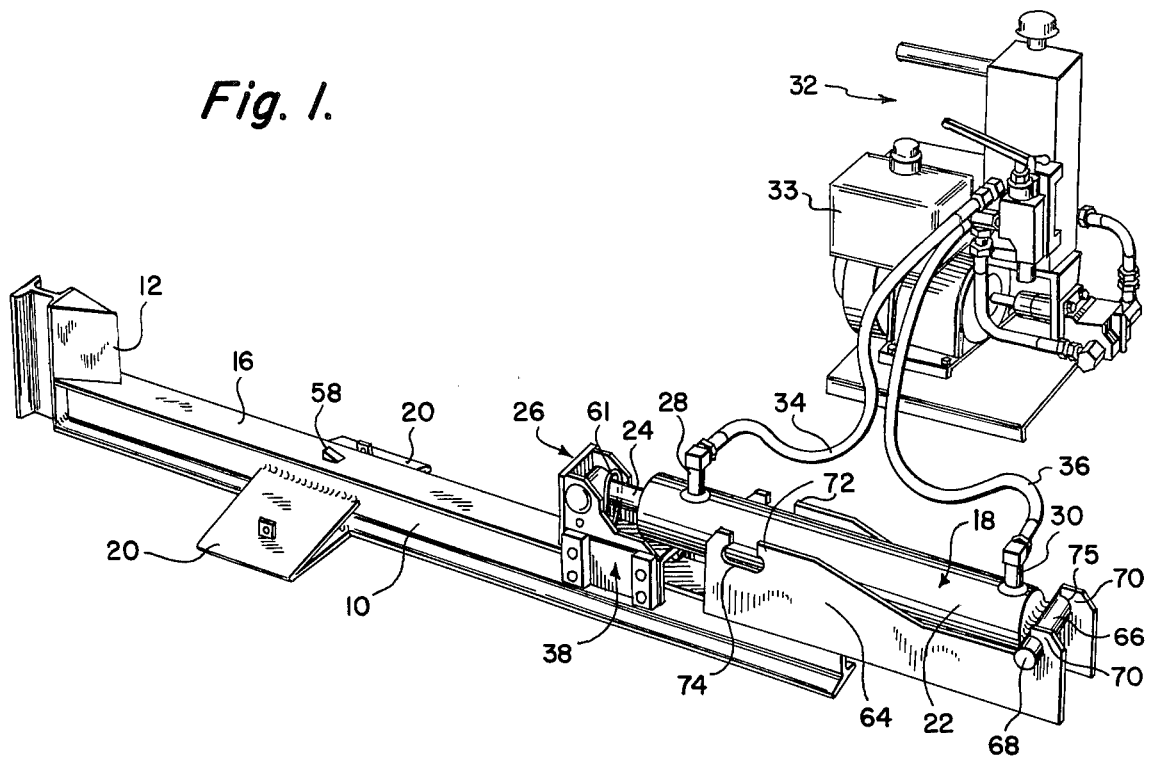
FIG. 1 is a perspective view of one embodiment of the invention in its initial position.
Figure 2:
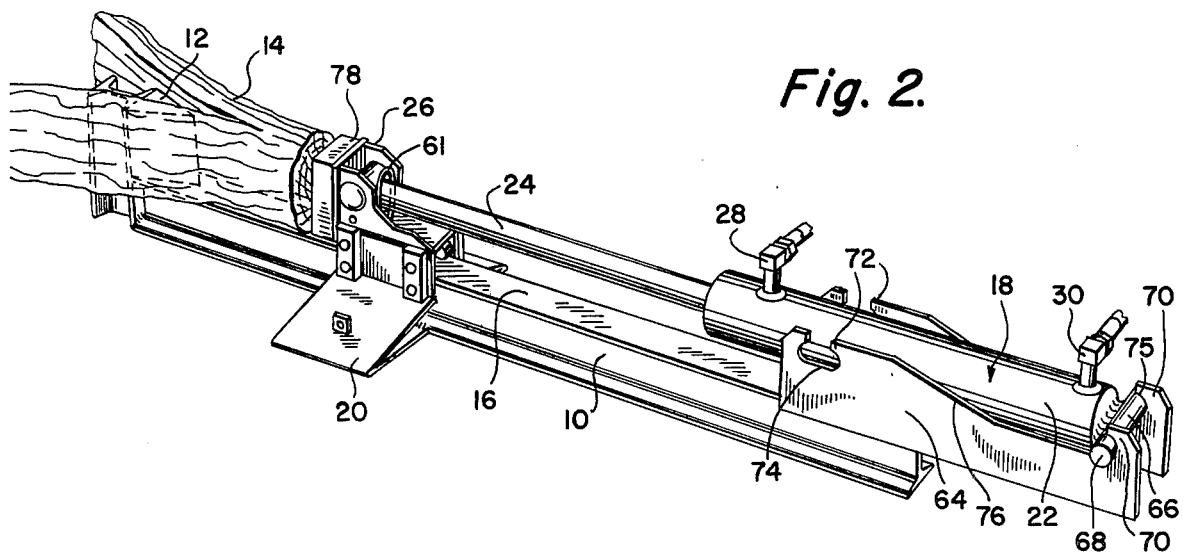
FIG. 2 is a perspective view of the ram and beam portions of the embodiment of FIG. 1 at the end of the first log splitting stroke.

Referring to FIGS. 1 and 2, one embodiment of the invention includes an elongated I-beam 10 which has a wedge 12 rigidly attached to one end thereof in a position to split a log 14 laid on the upper flange 16 of beam 10, and has a double acting fluid pressure operated ram 18 mounted on the other end of beam 10 in position to push log 14 against wedge 12. Outriggers 20 are attached to opposing sides of beam 10 to furnish stability. Ram 18 is preferably a hydraulic ram.

Hydraulic ram 18 has a cylinder 22 and an extendable and retractable piston rod 24 which is pivotally connected at its outer end to an impact member 26 and is connected at its inner end to a conventional piston within cylinder 22. Hydraulic ports 28 and 30 are provided at opposite ends of cylinder 22, and hydraulic fluid is circulated under pressure into and out of ports 28 and 30 by a conventional hydraulic pump and control unit 32 which is coupled to ports 28 and 30 through hoses 34 and 36. Hydraulic pump and control unit 32 is driven by a suitable motor which may be a conventional internal combustion engine 33, as illustrated, and which includes a conventional hydraulic circuit with the usual manually actuated hydraulic valve for controlling the extension and retraction of piston rod 24.

Impact member 26 is rollably connected to the top flange 16 of beam 10 by a carriage 38 having two pairs of upper rollers 40 (FIGS. 3 and 6) journaled therein for rolling on top of flange 16, and two pairs of lower rollers 42 rollably engageable with the underside of flange 16. Rollers 40 and 42 are journaled on the sides of a U-shaped frame 44, and impact member 26 is rigidly mounted on the carriage as illustrated.

The outer end of piston rod 24 is welded to a transversely extending sleeve 46 (FIGS. 4, 5, and 6). A pintle 50 connected to the opposing sides 48 of impact member 26 extends through sleeve 46. Below pintle 50, a pawl 52 is pivoted between sides 48 on a pin 54 which projects downwardly through an opening 56 in carriage 44 (FIGS. 3, 5, and 6) to coact with a small triangular latch tooth 58 on the top of flange 16. The pawl may rock in a counterclockwise direction in FIG. 4 to ride up the inclined surface of latch tooth 58, and is linear at the end 62 to abut latch tooth 58, as shown in FIG. 5, and prevent clockwise rotation after pawl 52 has dropped down over the vertical edge of tooth 58 as shown in FIG. 5. This latches impact member 26 and carriage 38 to tooth 58 and prevents them from being retracted at the end of the first stroke of ram 18 for reasons that are discussed below. A manual release cable 61 is connected between pawl 52 and piston rod 24 to permit the latch to be manually disengaged when it is desired to return impact member 26 and carriage 38 to their original positions.

To support ram 18, a pair of spaced vertical side rails 64 (FIGS. 1 and 2) are welded to opposite sides of beam 10 on the end thereof opposite wedge 12. A rod 66 having outwardly projecting ends 68 which form trunnions or reaction members is welded to the rear end of cylinder 22. Trunnions 68 ride on the upper ramp edges 76 of side rails 64 and are restrained from rearward movement by abutments 70 at the rear of side rails 64 and by forwardly spaced abutments 72 near the forward ends of side rails 64. Abutments 72 are formed by notches 74 in side rails 64 and abutments 70 are formed by notches 75. The upwardly sloping ramps 76 on the upper edges of side rails 64 between rear abutments 70 and front abutments 72 lift trunnions 68 above notches 74 as cylinder 22 is pulled forwardly during retraction of the ram while the impact member 26 is anchored. Ramps 76 lift trunnions 68 so that they can drop into notches 74 when cylinder 22 is moved far enough forwardly.

FIGS. 1 and 7A show the initial position of the various components of the log splitter when a log 14 is first placed thereon to be split. If log 14 is shorter than the stroke of the log splitter, an adapter block 78 of selected size (FIG. 2) can be placed between impact member 26 and the adjacent end of log 14 to take up the gap.

To initiate the first stroke of hydraulic ram 18, the manual control valve is actuated to extend piston rod 24 and cause impact member 26 to act against the adjacent end of log 14, thereby forcing the other end of log 14 into wedge 12 and initiating a split of log 14. The position of the component parts of the log splitter at the end of the first stroke is shown in broken lines in FIG. 7A. If log 14 is straight grained and dry, it may split completely on the first stroke, but in certain instances and on certain types of wood, such as elm, the first stroke only begins the split and a second stroke is required to complete it.

Near the end of the first stroke of ram 18, pawl 52 rides up over the inclined edge of tooth 58, as in FIG. 4, and drops in place behind the vertical edge thereof as shown in FIG. 5, to latch impact member 26 and carriage 38 to the beam 10. Thereafter, when the hydraulic valve is reversed to retract piston rod 24, it is not possible for piston rod 24 to move since it is latched to beam 10 at its outer end. Instead, the reversal of hydraulic action causes cylinder 22 to be pulled forwardly on beam 10, trunnions 68 riding up ramps 76 and dropping into notches 74 as shown in FIG. 7B. Thus, instead of returning impact member 26 and carriage 38 to their original position, the retraction stroke of piston rod 24 moves trunnions 68 out of engagement with abutments 70 and into engagement with the longitudinally spaced abutments 72 to prepare for a second stroke of piston rod 24. The fact that the retraction stroke of piston rod 24 moves cylinder 22 into a new position closer to the wedge, and supports cylinder 22 in the new position, enables a second stroke to be performed which is as long as the first stroke, thereby doubling the effective stroke of ram 18. Thus, a double length and double size ram is not required. This substantially reduces the length, weight, size, and cost of the log splitter without impairing its effectiveness.

In the second stroke of hydraulic ram 18, piston rod 24 is hydraulically extended again and pushes impact member 26 and carriage 38 against the end of log 14 to complete the split therein. The position of the various components of the log splitter at the end of the second stroke is shown in FIG. 7C. At the end of the second stroke, impact member 26 and carriage 38 are close enough to wedge 12 to complete the split in the toughest of logs, of which elm is an example because of its stringy nature.

To return the log splitter to its original position in preparation for splitting another log, piston rod 24 may be retracted hydraulically to its intermediate position after wire loop 61 has been pulled to lift pawl 52 over latch tooth 58. This may be accomplished manually or by lifting cylinder trunnion 68 out of notches 74 and then swinging the cylinder until the wire loop pulls the pawl out of engagement with latch tooth 58. The ram 18 may then be manually moved back to its original position, with trunnions 68 engaged against abutments 70. If desired, ram 18 can be lifted and moved back to its original position before piston rod 24 is retracted. Either procedure returns the components of the log splitter back to the initial position shown in FIG. 1 in preparation for splitting another log.

In the modification shown in FIG. 8, all parts in common with the parts heretofore described in connection with the form of the invention of FIGS. 1 through 7 are designated by the same numerals, but in a 100 series. The principal difference in the modification is that the rails 64 with their notches 74 of FIG. 1 are omitted. Instead, the function of the abutment members 70 of the form of the invention of FIG. 1 is performed by the abutment pins 170 shown in FIGS. 8 and 9. These pins have laterally projecting ends, as shown in FIG. 9, and there may be two or more sets such as shown at 170' and 170". As an alternative to FIG. 9, the abutment pin may be arranged as at 270 in FIG. 10 in a beam 210 which comprises a pair of spaced channels. This leaves a space 271 between the two parts of the beam.

Figure 8:
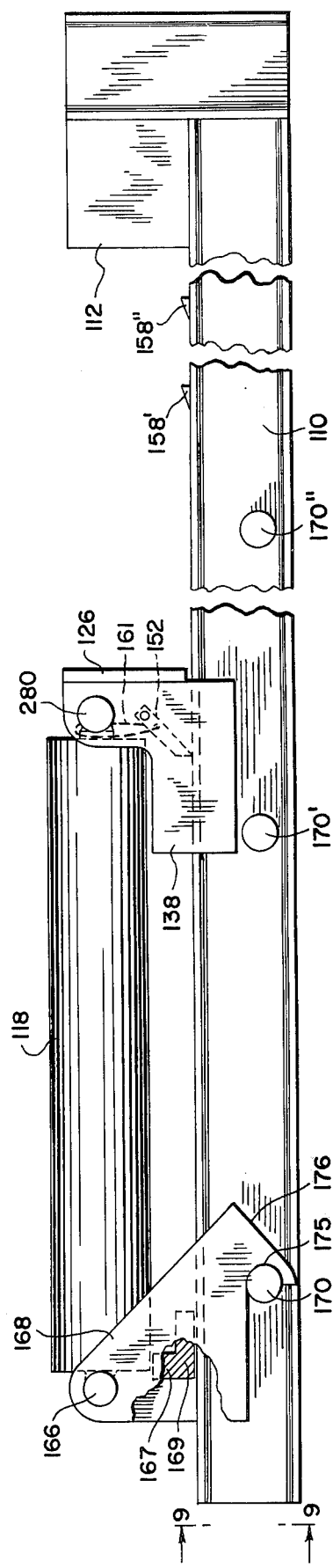
FIG. 8 is a side elevational view showing a modification
Figure 9:
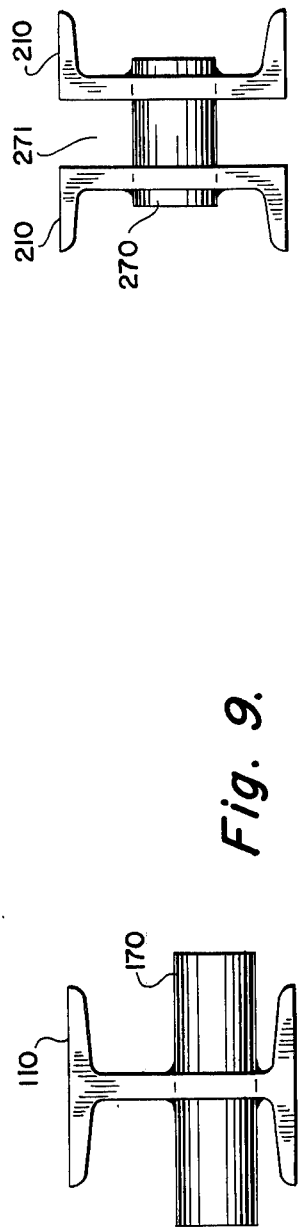
FIG. 9 is a sectional view taken on the line 9—9 of FIG. 8.

Mounted on the pin 166 of FIG. 8, which corresponds to the pin 66 of FIGS. 1 and 2, is a pair of pivoted reaction wings 168. Extending between the wings is a transverse bar 167 which is engageable with a block 169, as shown in FIG. 8, when the wings 168 are in the position of FIG. 8. With this arrangement, when the ram of the cylinder 118 is extended, the impact member 126 will be moved forwardly with the carriage 138 until the stop tooth 158 is engaged. During such movement, the hooked portions 175 of the wings 168 react against the ends of the abutment pins 170, the block portions 169 bracing against the top of the beam.

After the original stroke of the ram has been completed, then, by reversing the action of the hydraulic fluid in the cylinder 118, will be pulled forwardly toward the locked carriage. During such movement, the wings 168 will also be carried forwardly, the inclined portions 176 riding over the next set of abutment pins 170' until the wings 168 snap over the pins 170' into a similar position of engagement to that shown at 170 in FIG. 8. The device will then be ready for a second forward stroke of the ram. As shown in FIG. 8, there may be more than two sets of abutment pins, depending upon requirements. During upward counterclockwise swinging of the wings 168, as they are about to engage another abutment pin, the block portions 167 and 169 merely pivot upwardly with the wings, away from the beam.

Figure 10:
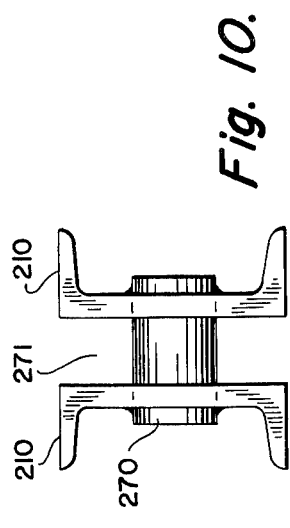
FIG. 10 is a sectional view taken on the line 9—9 of FIG. 8 showing an alternate shape for the beam.

FIG. 10 merely shows a variation of FIG. 9. Here there would be only one of the wings 168 which would ride between the two portions of the beam 210 in the space 271 for engagement with an intermediate portion of an abutment pin 270 instead of with end portions as in FIG. 9.

After a log has been split with the apparatus of FIG. 8, the wings 168 may be swung up and lifted off of the beam, with the ram pivoting on its forward pin 280. This causes a pull on the wire loop 161 and disengagement of the pawl 152 from the stop tooth 158. The complete cylinder assembly with the wings 168 can then be drawn back to the left to a starting position, ready for a new log.

Various changes and modifications may be made without departing from the spirit of the invention, and all of such changes are contemplated as may come within the scope of the following claims.

What I claim is:

1. A log splitter comprising an elongated beam, a wedge anchored to a first end of said beam, fluid pressure operated ram means having reaction means at one end and having an extensible impact member at its opposite end for engagement with one end of a log which is positioned on said beam between said impact end and said wedge, said reaction means including at least one wing pivoted to said cylinder having a hooked reaction portion for coaction with said abutment means, and longitudinally spaced alternate abutment means on said beam for coaction with said reaction means in either of at least two positions, one of which is closer to the wedge than the other.

2. A log splitter as claimed in claim 1 wherein the abutment means comprises transverse abutment pins on said beam.

3. A log splitter comprising: an elongated beam, a wedge fastened to said beam for splitting a log, a fluid pressure operated ram means comprising a double acting fluid pressure operated cylinder disposed in the lengthwise direction of said beam and having a piston rod that is extensible and contractible under the influence of fluid pressure in said cylinder, an impact member fastened to an end of said piston rod for exerting pressure on one end of a log which is positioned between said impact member and said wedge, reaction means comprising oppositely extending trunnions and guide means comprising rails, said rails having edges for cooperating with said trunnions, one of said guide means and said trunnion means being fastened to said cylinder and the other of said guide means and said trunnion means being fastened to said beam, said rails having pairs of notches with at least two of said pairs being spaced from each other in the lengthwise direction of said cylinder, latching means on said beam and said impact member operative to latch when said impact member is extended a predetermined amount, said cylinder means being advanceable from a position wherein said trunnions are in one pair of notches to a position wherein said trunnions are in another pair of notches during latching due to said contraction of said piston rod.

4. A log splitter as claimed in claim 3 in which said impact member is part of a carriage, and in which there is means between the carriage and beam for guiding the carriage in longitudinal movement therealong.

5. A log splitter as claimed in claim 4 wherein said beam is an I-beam, and wherein said means for guiding said carriage comprises wheels on said carriage rollably engaging the upper flange of said I-beam.

6. A log splitter as claimed in claim 5 wherein there is a first set of wheels on said carriage rollably engaging the top surface of said upper flange, and wherein there is a second set of wheels on said carriage rollably engaging the under surface of said upper flange.

7. A log splitter as claimed in claim 3 wherein there is a ramp on the upper edge of each of said rails extending from the lower portion of the notches which are more remote from said wedge to the notches which are closest to the wedge.

* * * * *